(12) United States Patent
Garfinkle

(10) Patent No.: US 6,370,568 B1
(45) Date of Patent: Apr. 9, 2002

(54) DIGITAL REAL TIME POSTCARDS INCLUDING INFORMATION SUCH AS GEOGRAPHIC LOCATION OR LANDMARK

(76) Inventor: Jeffrey Garfinkle, 76 W. 85th St., Apt. 2C, New York, NY (US) 10024

( * ) Notice: Subject to any disclaimer, the term of this patent is extended or adjusted under 35 U.S.C. 154(b) by 0 days.

(21) Appl. No.: 09/664,470

(22) Filed: Sep. 18, 2000

Related U.S. Application Data

(63) Continuation of application No. 09/165,678, filed on Oct. 2, 1998.

(51) Int. Cl.[7] ............................................... G06F 15/16
(52) U.S. Cl. ...................... 709/206; 709/132; 709/250; 709/204; 395/117; 710/129; 382/217; 382/218
(58) Field of Search .............................. 709/206, 232, 709/250; 396/57, 639; 379/93.24; 386/46; 355/27; 707/3; 395/117; 710/129; 348/598; 382/217, 218

(56) References Cited

U.S. PATENT DOCUMENTS

| | | | | |
|---|---|---|---|---|
| 5,345,313 A | * | 9/1994 | Blank | 348/598 |
| 5,530,793 A | * | 6/1996 | Watkins et al. | 395/117 |
| 5,587,740 A | | 12/1996 | Brennan | 348/373 |
| 5,778,164 A | * | 7/1998 | Watkins et al. | 395/117 |
| 5,796,394 A | | 8/1998 | Wicks et al. | 345/329 |
| 5,872,925 A | | 2/1999 | Han | 395/200.36 |
| 5,923,848 A | | 7/1999 | Goodhand et al. | 395/200.49 |
| 5,961,589 A | | 10/1999 | Hansen | 709/205 |
| 5,964,833 A | | 10/1999 | Kikinis | 709/206 |
| 5,983,263 A | | 11/1999 | Rothrock et al. | 709/204 |
| 5,995,770 A | | 11/1999 | Rockford et al. | 396/311 |
| 6,006,039 A | * | 12/1999 | Steinberg et al. | 396/57 |
| 6,014,688 A | * | 1/2000 | Venkatraman et al. | 709/206 |
| 6,017,157 A | * | 1/2000 | Garfinkle et al. | 396/639 |
| 6,018,774 A | * | 1/2000 | Mayle et al. | 709/250 |
| 6,058,428 A | * | 5/2000 | Wang et al. | 709/232 |
| 6,072,861 A | * | 6/2000 | Yu | 379/93.24 |
| 6,139,197 A | * | 10/2000 | Banks | 709/217 |
| 6,141,482 A | * | 10/2000 | Massarksy | 386/46 |
| 6,145,046 A | * | 11/2000 | Jones | 710/129 |
| 6,147,742 A | * | 11/2000 | Bell et al. | 355/27 |
| 6,202,061 B1 | * | 3/2001 | Khosla et al. | 707/3 |

* cited by examiner

Primary Examiner—David Wiley
Assistant Examiner—Thu Ha Nguyen
(74) Attorney, Agent, or Firm—Walter J. Tencza, Jr.

(57) ABSTRACT

An apparatus is provided comprised of a digital camera having a button, a processor connected to the digital camera, and a telecommunications line connected to the processor. When the button of the digital camera is pressed the digital camera creates a digital image and sends the digital image to the processor. The processor sends the digital image out to the telecommunications line. The processor may automatically send the digital image out or may wait for inputs from a user before it sends the digital image out. The processor can be connected to an interactive device such as a computer keyboard or computer mouse. The processor is adaptable to receive a user input in the form of an electronic mailing address and the processor can send the digital image out on the telecommunications line to the electronic mailing address. The processor produces a first screen on a computer monitor. The first screen has a field for entering the electronic mailing address, a field for entering a message, and a field for the digital image. The processor preferably sends the digital image to the E-mail address in postcard format with a geographical indication of where its from.

26 Claims, 4 Drawing Sheets

DIGITAL REAL TIME POSTCARDS INCLUDING INFORMATION SUCH AS GEOGRAPHIC LOCATION OR LANDMARK

CLAIM FOR PRIORITY OF PARENT APPLICATION

This application is a continuation and claims the priority of parent application Ser. No. 09/165,678 filed on Oct. 2, 1998, originally titled "ELECTRONIC MAIL DEVICE AND METHOD" and the title later amended to "DIGITAL REAL TIME POSTCARDS INCLUDING INFORMATION SUCH AS GEOGRAPHIC LOCATION OR LANDMARK", which is the same title as this continuation.

FIELD OF THE INVENTION

This invention relates to methods and apparatus for transmitting data and images over telecommunications lines.

BACKGROUND OF THE INVENTION

Generally speaking, sending data and images over telecommunications lines is known. However, the particular embodiments of the present invention are believed not to be known in the prior art.

SUMMARY OF THE INVENTION

It is an object of the present invention to provide a method and apparatus for taking and transmitting digital images over telecommunications lines, preferably in real time. In one embodiment digital images are combined with customized text and the combined data is transmitted over a telecommunications line.

It is an object of this present invention to provide an apparatus where a digital postcard picture can be taken of an individual in front of a well known landmark, preferably immediately downloaded to a computer, placed in postcard format, customized with personalized text, and then electronically mailed to another individual. Preferably the digital photographs taken do not use superimposition.

One advantage of the present invention is that a digital image or digital postcard may be instantly sent via e-mail to anyone in the world on a real-time basis. In other words, with this technology, "Wish You Were Here" will no longer refer to a week or ten days ago (as is the case when a postcard or photo is direct mailed) it will mean now.

In one embodiment an apparatus is provided comprised of a digital camera having a button and an output port, a transmitting processor having a first input port connected to the digital camera, and a first output port, and a telecommunications line connected to the first output port of the transmitting processor. When the button of the digital camera is pressed the digital camera creates a digital image and sends the digital image to the first input port of the transmitting processor. The transmitting processor sends the digital image out via its first output port to the telecommunications line. The transmitting processor may automatically send the digital image out or may wait for inputs from a user via a second input port before it sends the digital image out. The second input port of the transmitting processor can be connected to an interactive device such as a computer keyboard or a computer mouse.

The transmitting processor can be adaptable to receive a user input in the form of an electronic mailing address and any additional text (i.e. personalized message), at its second input port and the processor can send the digital image out (with any optional text) on its first output port on the telecommunications line to the electronic mailing address after receiving the electronic mailing address. The processor may have a second output port which is connected to an input port of a computer monitor. The processor may produce a first screen on the computer monitor, the first screen comprised of a first field for entering the electronic mailing address.

The processor may attach an alphanumeric message to the digital image and send an alphanumeric message out its first output port on the telecommunications line with the digital image. The first screen produced by the processor on the computer monitor is further comprised of a second field for entering the alphanumeric message to be attached to the digital image. The first screen may also be comprised of a third field, i.e. a "send" field, which when activated causes the digital image to immediately be sent out on the telecommunications line. The first screen may also be comprised of a fourth field on which the processor produces the digital image. A fifth field may also be provided on the first screen for entering further electronic addresses.

The processor may take a digital image and put it in postcard format before the digital image is sent out onto the telecommunications line. The processor may attach a geographical indication to the digital image. The geographical indication would specify where the digital image was taken, such as "greetings from New York City" or "greetings from the Statue of Liberty". The processor would send a combination of the digital image and the geographical indication out on the telecommunications line.

DETAILED DESCRIPTION OF THE DRAWINGS

Figure 1:
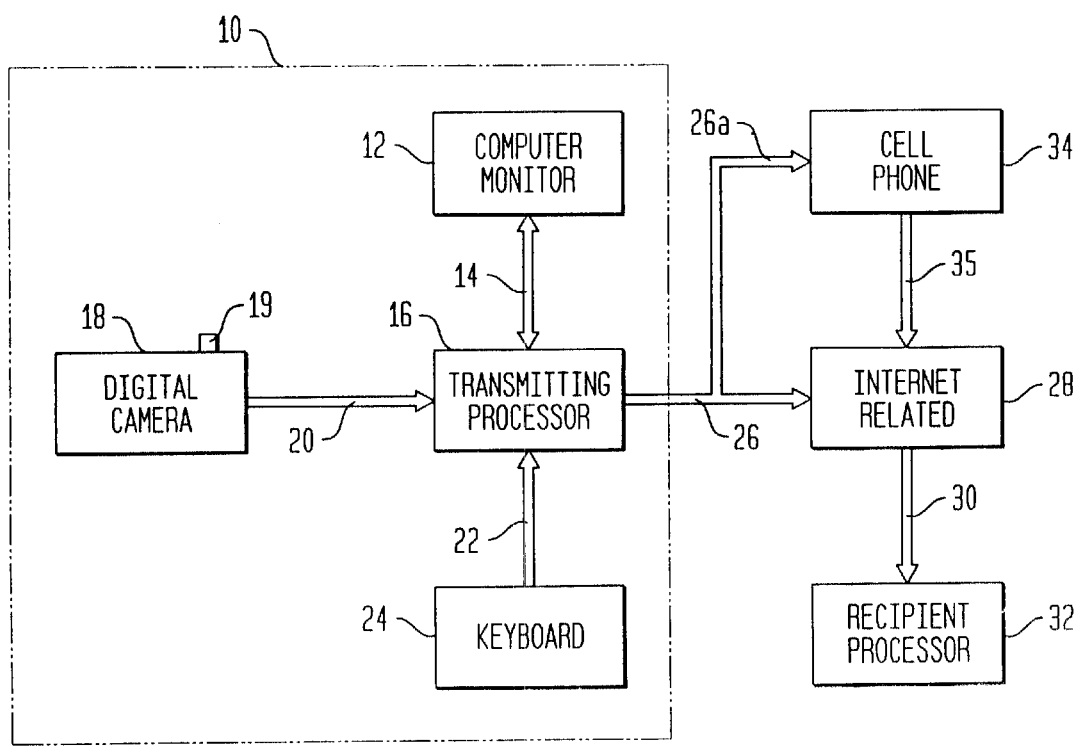
FIG. 1 shows a block diagram of an apparatus in accordance with the present invention which is connected through a telecommunications line to the Internet and to a recipient processor.

FIG. 1 shows a block diagram of an apparatus 10 in accordance with the present invention which is connected through a telecommunications line 26 to the Internet 28, which is connected to a telecommunications line 30, and to a recipient processor 32. Optionally or additionally, the apparatus 10 may be connected through telecommunications lines 26 and 26a (line 26 and line 26a may in fact be one and the same) to a portable telephone such as a cellular phone 34 and through a conceptual wireless telecommunications line 35 to the Internet 28. The apparatus 10 may be comprised of a computer monitor 12, a transmitting processor 16, a digital camera 18, and a keyboard 24. The digital camera 18 is connected via an output port to a first input port of transmitting processor 16 via a bus 20. (The bus 20, and the busses generally, can be thought of as including the input port and the output port). The digital camera 18 may have a button 19 for taking a digital picture or digital image. The digital camera may be any type of commercially available camera which can interface with a conventional computer. The transmitting processor 16 may be any personal computer but in this case preferably would be a laptop computer for portability.

The keyboard 24 is connected via its output port to a second input port of the transmitting processor 16 via a bus 22. The computer monitor 12 is connected via its input port to a second output port of the transmitting processor 16 via bus 14. The transmitting processor 16 has a first output port which is connected to the telecommunications line 26. The telecommunications line 26 can be replaced by a cell phone 34 which communicates in a wireless manner over conceptual telecommunications lines 35.

Figure 2:
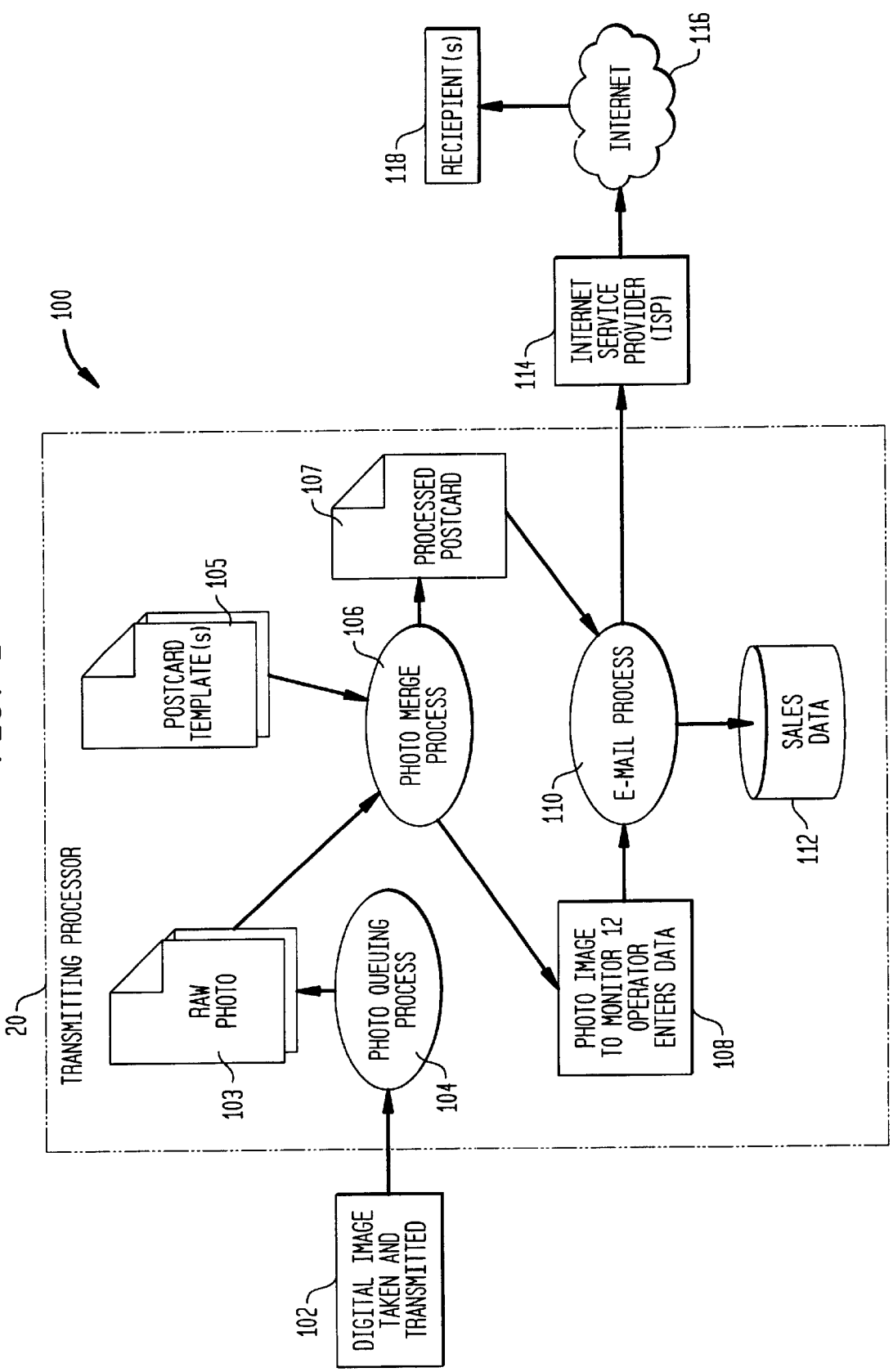
FIG. 2 shows a flow chart of the operation of an embodiment of the present invention.

FIG. 2 shows a flow chart 100 of the operation of an embodiment of the present invention. At step 102 a user presses the button 19 on the digital camera 18. In response to the pressing of button 19, a digital image is taken by digital camera 18 and transmitted via bus 20 (shown in FIG. 1) to the transmitting processor 16. The bus 20 may be include a personal computer ("PC") serial port. At step 104 the transmitting processor 16 takes a picture stream of the digital image and converts it into a personal computer file, which is shown in FIG. 2 and identified as "raw photo" 103. (preferably a single photo) (such as a bitmap file or a JPEG file, "JPEG" is a term of art and inventor doesn't know what the initials stand for). The file is saved in a raw photo folder on the transmitting processor 16. The transmitting processor 16 preferably includes a memory device for storing data. At step 106 a photo merge process receives raw photo data 103 and merges the digital images of 103 with a postcard template 105. The postcard template may be stored in the memory of the transmitting processor 16. The postcard template 105 preferably overlays text over the digital image 103, which preferably indicates a geographical location where the image was taken or landmark shown in the digital image 103. A processed digital postcard (in the processor 16) is formed and shown conceptually at 107. A copy of the digital image is sent to the computer monitor 12 and appears on a screen 200, shown by FIG. 3. and referred to by step 108. A user or operator enters data at step 108.

Figure 3:
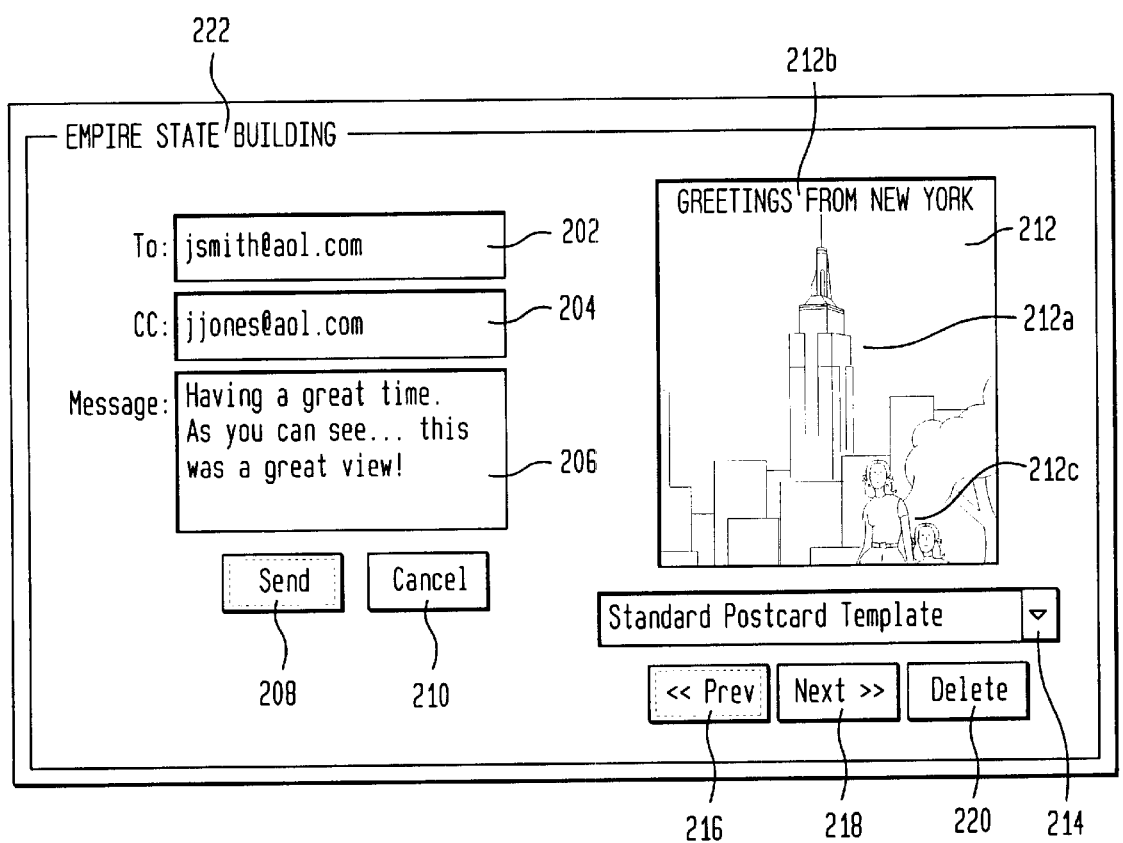
FIG. 3 shows a screen related to sending images which may be produced on a computer monitor by a transmitting processor in accordance with the present invention.

Step 108 will be explained with reference to FIG. 3. FIG. 3 shows a screen 200 which would appear on computer monitor 12. The screen 200 includes first electronic mail (E-mail) address field 202, cc (carbon copy) E-mail address field 204, alphanumeric message field 206, send message field 208 and cancel message field 210. Also shown on screen 200 is the digital image field 212 which includes a digital photo 212a. Also overlaid on top of the digital image or photo 212a is greeting and a geographical or landmark location where the digital image was taken. This is shown as text 212b which is "GREETINGS FROM NEW YORK". The individuals, 212c are shown in from the Empire State Building. There is also a field 214 for selecting among various formats. Currently shown on FIG. 3 is the "Standard Postcard Template". Other templates may be provided.

The screen 200 also includes field 216 named "<<Prev" for getting a previous digital image into the digital image field 212; "Next >>" field 218 for getting the next image into the digital image field 212; and "Delete" field 220 for deleting the image currently in the digital image field 212 from the processor 16. Digital images may be taken and stored in memory in the transmitting processor 16 while an individual, for example, is looking for their E-mail address. Meanwhile, other digital images may be taken by the digital camera 18, downloaded to processor 16 and sent out on the communications line 26. Also there is shown a heading field 222 which includes the name of the site for the digital photo image in field 212, which in this case is "Empire State Building".

If the cell phone 34 is used and if the telecommunication line 26 is not directly connected to the Internet 28 (such as through a hard wired phone line), then the cell phone 34 connects with the Internet 28 through a wireless telecommunications line 35. The wireless telecommunications line 35 is meant to conceptually include a wireless transmitter, transmission airwaves, a satellite, a wireless receiver, and the connection to the Internet 28. Cell phones may be useful for the present invention if digital images are being taken at a remote location where there are no hard wired telecommunications lines.

Figure 4:
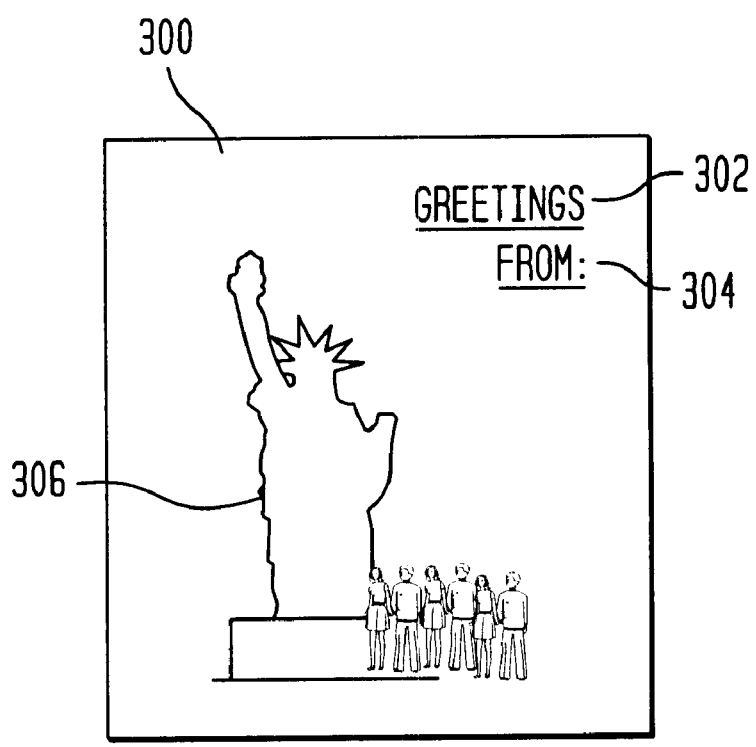
FIG. 4 shows a screen to be produced on a recipient processor.

FIG. 4 shows a depiction of a sample digital image 300 and related information when it is received at a recipient processor such as processor 32 shown in FIG. 1. The digital image 300 includes the image 306 (in this case the statue of liberty and people standing under it) and the headings "GREETINGS" under number 302 and "FROM" under number 304. Under the "FROM" designation preferably a designation of geographic location of the photo image will be provided. Instead of a geographic location, text can be provided identifying the landmark in the image 306 such as "GREETINGS FROM THE STATUE OF LIBERTY".

I claim:

1. An apparatus comprised of:

a digital camera having an actuator and an output port;

a processor having a first input port connected to the digital camera, and a first output port and a memory;

a telecommunications line connected to the first output port of the processor;

wherein when the actuator of the digital camera is actuated the digital camera creates a first digital image and sends the first digital image to the first input port of the processor, wherein the processor attaches a geographical indication from a standard postcard template to the first digital image to form a second digital image, the geographical indication indicating where the first digital image was taken by the digital camera;

wherein the standard postcard template including its geographical indication is stored in the memory of the processor and the processor automatically attaches the geographical indication to the first digital image when the actuator of the digital camera is actuated; and wherein the processor sends the second digital image out via its first output port to the telecommunications line.

2. The apparatus of claim 1 and wherein:

the processor has a second input port;

the processor waits to receive one or more user inputs at its second input port before sending the digital image to the telecommunications line.

3. The apparatus of claim 2 and wherein:

the second input port of the processor is connected to an interactive device.

4. The apparatus of claim 1 and wherein:

the geographical indication is comprised of text specifying a geographical location.

5. The apparatus of claim 2 and wherein:

the processor is adaptable to receive a user input in the form of an electronic mailing address at its second input port and the processor sends the digital image out on its first output port on the telecommunications line to the electronic mailing address after receiving the electronic mailing address.

6. The apparatus of claim 5 and further wherein:

the processor has a second output port;

a computer monitor having an input port which is connected to the second output port of the processor;

wherein the processor produces a first screen on the computer monitor, the first screen comprised of a first field for entering the electronic mailing address.

7. The apparatus of claim 1 and further wherein:

the processor attaches an alphanumeric message to the digital image and sends an alphanumeric message out its first output port on the telecommunications line with the digital image.

8. The apparatus of claim 7 and further wherein:

the first screen produced by the processor on the computer monitor is further comprised of a second field for entering the alphanumeric message to be attached to the digital image.

9. The apparatus of claim 6 and further wherein:

the first screen produced by the processor on the computer monitor is further comprised of a third field which when activated causes the digital image to immediately be sent out on the telecommunications line.

10. The apparatus of claim 5 and further wherein:

the first screen produced by the processor on the computer monitor is further comprised of a fourth field on which the processor produces the digital image.

11. The apparatus of claim 5 and further wherein:

the first screen produced by the processor on the computer monitor is further comprised of a fifth field on which an individual can enter a second electronic mailing address, and wherein the processor sends out the digital image to the second electronic mailing address.

12. The apparatus of 4 and further wherein:

the text specifying the geographical location is overlaid on top of the first digital image to form the second digital image.

13. The apparatus of claim 1 wherein the geographical indication is comprised of a landmark indication.

14. The apparatus of claim 13 wherein the landmark indication is comprised of text identifying the landmark.

15. The apparatus of claim 14 wherein the text identifying the landmark is overlaid on top of the first digital image to form the second digital image.

16. A method comprised of the steps of:

taking a first digital image with a digital camera;

automatically attaching a geographical indication from a standard postcard template in memory to the first digital image to form a second digital image in response to the step of taking the first digital image with the digital camera, wherein the geographical indication indicates where the first digital image was taken by the digital camera; and sending the second digital image out on a telecommunications line.

17. The method of claim 16 wherein the geographical indication is a landmark indication.

18. The method of claim 16 wherein the geographical indication is comprised of text specifying a geographical location.

19. The method of claim 18 wherein the text specifying the geographical location is overlaid on top of the first digital image to form the second digital image.

20. The method of claim 17 wherein the landmark indication is comprised of text identifying a landmark.

21. A method comprising the steps of:

taking a first digital image with a digital camera;

automatically attaching a geographical indication from a memory to the first digital image to form a second digital image in response to the step of taking the first digital image with the digital camera, wherein the geographical indication indicates where the first digital image was taken by the digital camera;

wherein the geographical indication specifies a geographical location;

and wherein the geographical indication is overlayed on top of the first digital image to form the second digital image.

22. The method of claim 21 wherein the geographical indication is comprised of text specifying a geographical location;

and wherein the text specifying the geographical location is overlayed on top of the first digital image to form the second digital image.

23. The method of claim 21 further comprising the step of:

sending the second digital image out on a telecommunications line.

24. A method comprising the steps of:

taking a first digital image with a digital camera;

automatically attaching a geographical indication from a memory to the first digital image to form a second digital image in response to the step of taking the first digital image with the digital camera, wherein the geographical indication indicates the location of the subject of the first digital image;

and wherein the geographical indication is overlayed on top of the first digital image to form the second digital image.

25. The method of claim 24 further wherein the geographical indication is comprised of text specifying a geographical location;

and wherein the text specifying the geographical location is overlayed on top of the first digital image to form the second digital image.

26. The method claim 24 further comprising the steps of sending the second digital image out on a telecommunications line.

* * * * *